US012412301B2

(12) United States Patent
Stonestrom et al.

(10) Patent No.: US 12,412,301 B2
(45) Date of Patent: Sep. 9, 2025

(54) VISUAL DETECTION AND LOCALIZATION OF PACKAGE AUTOLOADERS BY UAV

(71) Applicant: WING AVIATION LLC, Mountain View, CA (US)

(72) Inventors: David Stonestrom, Mountain View, CA (US); Ali Shoeb, San Rafael, CA (US); Marcus Hammond, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 175 days.

(21) Appl. No.: 18/211,919

(22) Filed: Jun. 20, 2023

(65) Prior Publication Data

US 2024/0428440 A1 Dec. 26, 2024

(51) Int. Cl.
*G06T 7/73* (2017.01)
*B64D 45/00* (2006.01)
*B64U 10/20* (2023.01)
*B64U 101/30* (2023.01)
(Continued)

(52) U.S. Cl.
CPC .............. *G06T 7/73* (2017.01); *B64D 45/00* (2013.01); *B64U 10/20* (2023.01); *G06V 20/17* (2022.01); *B64U 2101/30* (2023.01); *B64U 2101/66* (2023.01); *G06T 2207/10032* (2013.01); *G06T 2207/20084* (2013.01)

(58) Field of Classification Search
None
See application file for complete search history.

(56) References Cited

U.S. PATENT DOCUMENTS

| 9,580,173 B1 | 2/2017 | Burgess et al. |
| 9,915,956 B2 * | 3/2018 | Bokeno ................. G05D 1/102 |
| 10,269,147 B2 | 4/2019 | Jones et al. |

(Continued)

FOREIGN PATENT DOCUMENTS

WO  WO-2022174371 A1 *  8/2022  ............... G05D 1/08

OTHER PUBLICATIONS

Zhao et al., "Estimating 6D Pose From Localizing Designated Surface Keypoints", arXiv:1812.01387v1 [cs.CV] Dec. 4, 2018, 9 pages (Year: 2018).*

(Continued)

*Primary Examiner* — Aniss Chad
*Assistant Examiner* — Jennifer M Anda
(74) *Attorney, Agent, or Firm* — Christensen O'Connor Johnson Kindness PLLC

(57) ABSTRACT

A technique for a UAV includes: acquiring an aerial image of an area below a UAV that includes one or more instances of an object; analyzing the aerial image with an image classifier to classify select pixels of the aerial image as being keypoint pixels associated with keypoints of the object; grouping the keypoint pixels into one or more groups each associated with one of the instances of the object, wherein first keypoint pixels of the keypoint pixels are grouped into a first group of the one or more groups associated with a first instance of the one or more instances of the object; generating an estimate of a relative position of the UAV to the first instance of the object based at least upon a machine vision analysis of the first keypoint pixels; and navigating the UAV into alignment with the first instance based upon the estimate.

21 Claims, 10 Drawing Sheets

(51) Int. Cl.
  *B64U 101/66* (2023.01)
  *G06V 20/17* (2022.01)

(56) References Cited

U.S. PATENT DOCUMENTS

| | | | |
|---|---|---|---|
| 10,284,875 | B2 | 5/2019 | Srinivasan et al. |
| 10,884,433 | B2 | 1/2021 | Tran et al. |
| 11,104,438 | B2 | 8/2021 | Prager et al. |
| 11,745,899 | B2 | 9/2023 | Jourdan et al. |
| 12,205,484 | B1* | 1/2025 | Hunter ................... G05D 1/247 |
| 2014/0010407 | A1* | 1/2014 | Sinha ....................... G06T 7/73 |
| | | | 382/103 |
| 2016/0257424 | A1 | 9/2016 | Stabler et al. |
| 2016/0364989 | A1* | 12/2016 | Speasl ...................... G08G 5/57 |
| 2020/0207485 | A1* | 7/2020 | Foggia ...................... B64F 1/22 |
| 2020/0301015 | A1 | 9/2020 | Siddiqui et al. |
| 2020/0301445 | A1* | 9/2020 | Jourdan ........... G06K 19/06037 |
| 2021/0224739 | A1* | 7/2021 | Sweeny ................. B64U 80/25 |
| 2021/0374975 | A1* | 12/2021 | Shoeb ..................... G06T 7/174 |
| 2022/0119105 | A1 | 4/2022 | Schmalzried et al. |
| 2023/0054875 | A1 | 2/2023 | Jourdan et al. |

OTHER PUBLICATIONS

Machine translation of WO-2022174371-A1 (Year: 2025).*
International Search Report and Written Opinion mailed Feb. 14, 2024, in corresponding International Application No. PCT/US2023/081663, 12 pages.
Zhao et al., "Estimating 6D Pose From Localizing Designated Surface Keypoints", arXiv:1812.01387v1 [cs.CV] Dec. 4, 2018, 9 pages.
Kaiwen Duan et al., "CenterNet: Keypoint Triplets for Object Detection", arXiv:1904.08189v3 [cs.CV] Apr. 19, 2019, 10 pages.
Tae Ha Park et al., "Towards Robust Learning-Based Pose Estimation of Noncooperative Spacecraft", arXiv:1909.00392v1 [cs.CV] AAS 19-840, Sep. 1, 2019, 20 pages.
Bo Chen et al., "Satellite Pose Estimation with Deep Landmark Regression and Nonlinear Pose Refinement", Computer Vision Foundation, ICCV Workshop paper is the Open Access version, Oct. 2019, 9 pages.
OpenCV (Open Source Computer Vision Library) Wikipedia, The Free Encyclopedia, Jun. 2000, 4 pages, Retrieved from "https://en.wikipedia.org/w/index.php?title=OpenCV&oldid=1146576754".
Perspective-n-Point, Wikipedia, The Free Encyclopedia, Jul. 19, 2022 5 pages Retrieved from "https://en.wikipedia.org/w/index.php?title=Perspective-n-Point&oldid=1099235396".
Mate Kisantal et al., "Satellite Pose Estimation Challenge: Dataset, Competition Design and Results", IEEE Transactions on Aerospace and Electronic Systems, arXiv:1911.02050v2 [cs.CV] Apr. 24, 2020, 15 pages.
David Lowe, "Scale-invariant feature transform", Wikipedia, The Free Encyclopedia, Feb. 28, 2023, 18 pages Retrieved from "https://en.wikipedia.org/w/index.php?title=Scale-invariant_feature_transform&oldid=1142129405".
Ian M. Crosby, "Wing Launches the Automated Wing Delivery Network, with Autoloader for Curbside Pickup", Dronelife, Mar. 9, 2023, 2 pages, https://dronelife.com/2023/03/09/wing-launches-the-automated-wing-delivery-network-with-autoloader-for-curbside-pickup-videos/.
The AutoLoader & Curbside pickup | Wing drone delivery, U-Tube video: https://www.youtube.com/watch?v=rABWi8w4sZw, Mar. 9, 2023, 2 pages of pictures.
The Wing Drone Delivery Network. U-Tube video: https://www.youtube.com/watch?v=xEcspDhZJuM&t=5s, Mar. 9, 2023, 4 pages of pictures.

* cited by examiner

| AUTOLOADER IMAGE DETECTION LIST 371 | | |
|---|---|---|
| AL GROUP: | 2D PIXEL COORDINATES: | KP TYPE: |
| 1 | X1,Y1 | LEFT ARM TIP |
| 1 | X2,Y2 | RIGHT ARM TIP |
| 1 | X3,Y3 | LEFT ELBOW |
| 1 | X4,Y4 | TOP OF POST |
| 2 | X5,Y5 | LEFT ARM TIP |
| 2 | X6,Y6 | RIGHT ARM TIP |
| 2 | X7,Y7 | TOP OF POST |
| ● ● ● | ● ● ● | ● ● ● |

Rows 1–4 are bracketed as KEYPOINT SET. Rows 5–7 are bracketed as KEYPOINT SET.

FIG. 5B

VISUAL DETECTION AND LOCALIZATION OF PACKAGE AUTOLOADERS BY UAV

TECHNICAL FIELD

This disclosure relates generally to machine vision detection and localization of objects by unmanned aerial vehicles.

BACKGROUND INFORMATION

An unmanned vehicle, which may also be referred to as an autonomous or semi-autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. The ability to pick up and drop off packages safely, efficiently, in a variety of space constrained environments, all in a low human touch manner, are beneficial attributes that will encourage marketplace adoption of UAV aerial deliveries.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 5B illustrates an autoloader image detections list output from an autoloader detector module, in accordance with an embodiment of the disclosure.

DETAILED DESCRIPTION

Embodiments of a system, apparatus, and method of operation of an unmanned aerial vehicle (UAV) capable of detection and localization of an autoloader to navigated the UAV into alignment with the autoloader for automated package retrieval are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
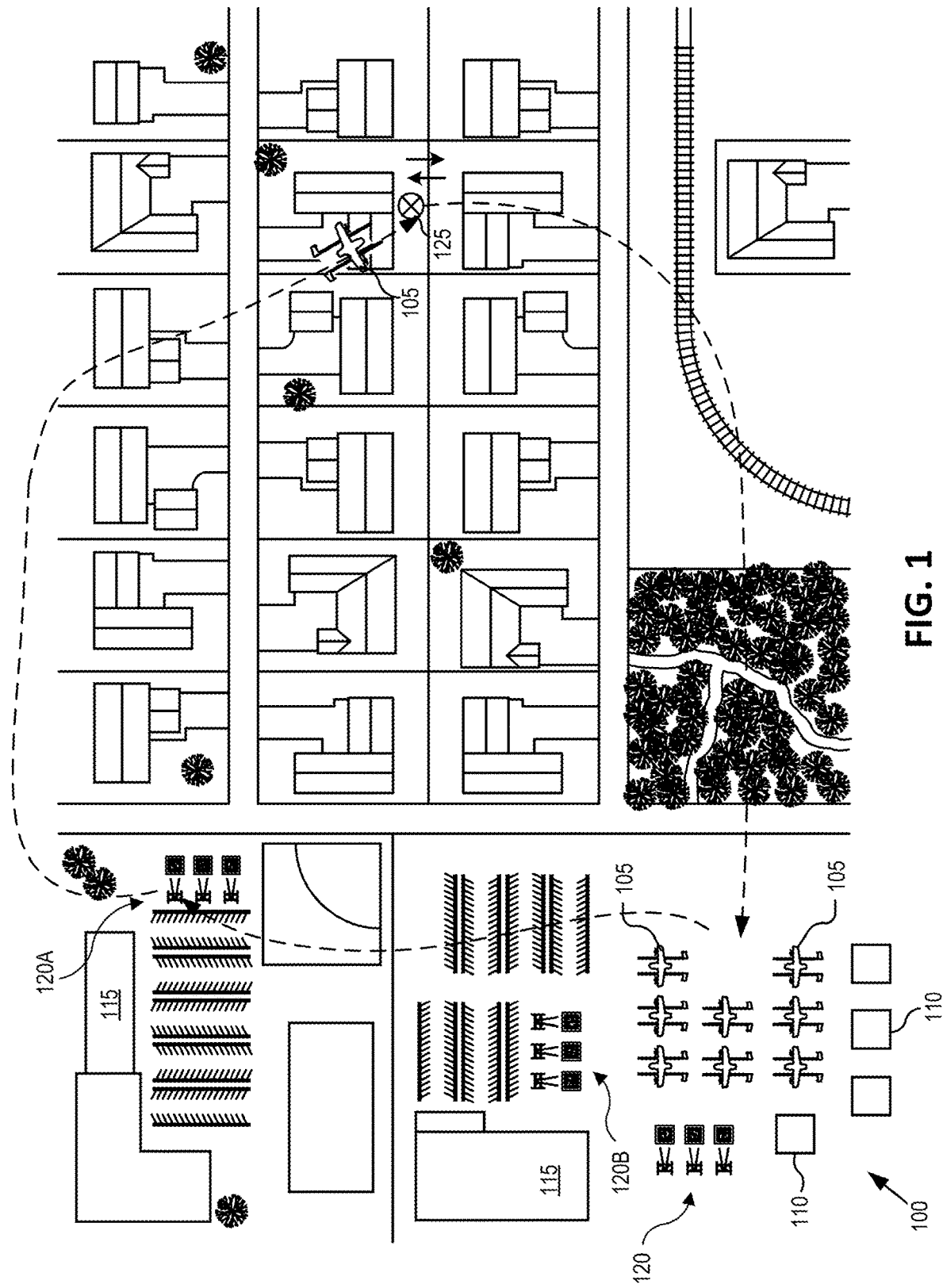
FIG. 1 illustrates operation of unmanned aerial vehicles (UAVs) that retrieve packages from autoloaders to provide an aerial delivery service to a neighborhood, in accordance with an embodiment of the disclosure.

FIG. 1 is a plan view illustration including a terminal area 100 for staging UAVs 105 that deliver packages into a neighborhood, in accordance with an embodiment of the disclosure. UAVs may one day routinely deliver small items into urban or suburban neighborhoods from small regional or neighborhood hubs such as terminal area 100 (also referred to as a local nest). Vendor facilities that wish to take advantage of the aerial delivery service may be set up immediately adjacent to terminal area 100 (such as vendor facilities 110) or be dispersed throughout the neighborhood such as vendor facilities 115. Attendants at the various vendor facilities 115 may load packages to be delivered by UAVs 105 onto autoloaders 120A or 120B (collectively referred to as 120) in anticipation of a pickup and delivery to a customer in the surrounding neighborhood. An example aerial delivery mission may include a UAV 105 taking off from terminal area 100, rising to a cruise altitude and flying to autoloader 120A where a package has been staged. As UAV 105 approaches the designated autoloader 120A, it enters a pickup segment of its flight mission, where it descends and navigates into alignment with the designated autoloader 120A using the machine vision perception processing pipeline described herein. After the package has been loaded onto the UAV 105, UAV 105 ascends back to its cruise altitude enroute to a customer destination 125. At destination 125, UAV 105 descends for package drop-off before once again ascending to a cruise altitude for the return journey back to terminal area 100.

Figure 2:
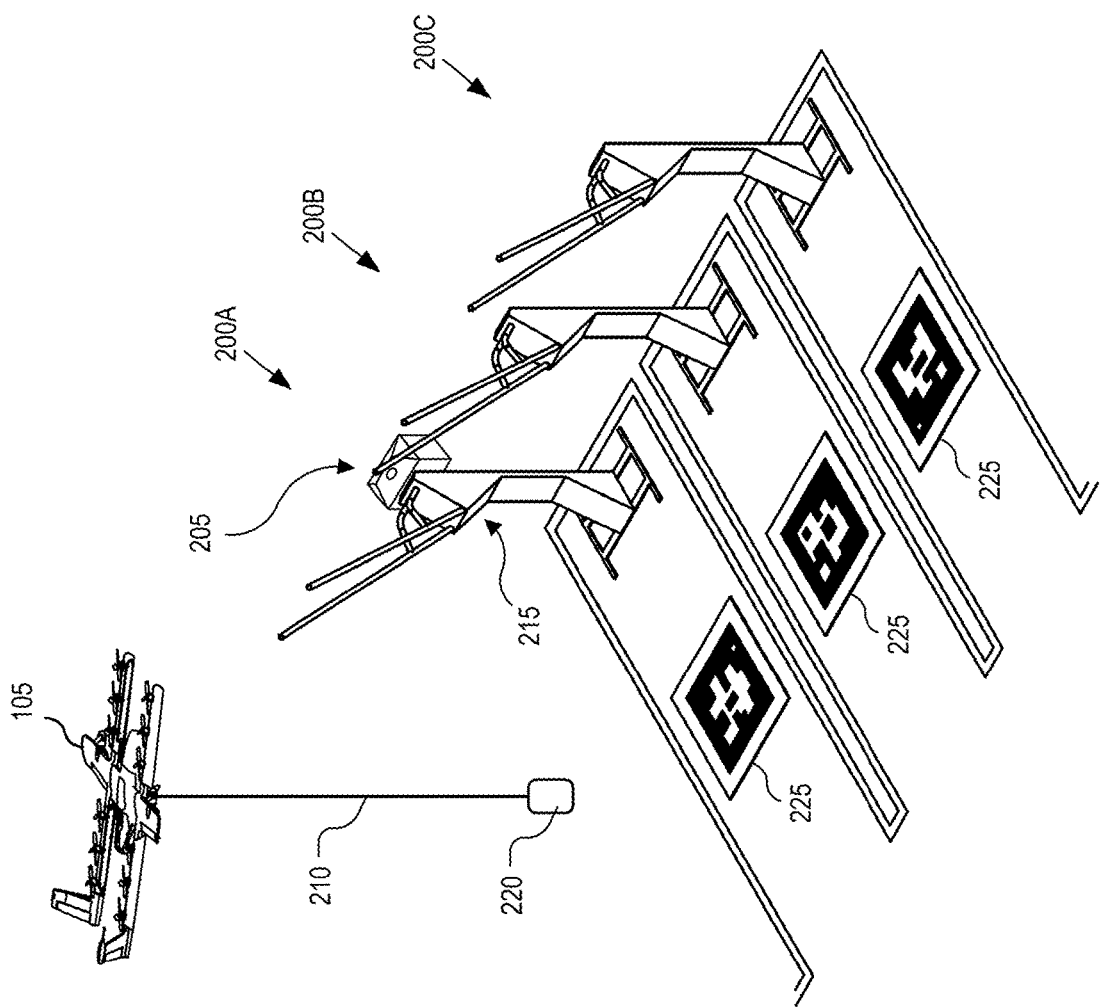
FIG. 2 is a perspective view illustration of a UAV navigating into alignment with an autoloader for package retrieval using an autoloader perception system adapted to detect, localize, and identify autoloaders, in accordance with an embodiment of the disclosure.

FIG. 2 illustrates a demonstrative bank of three autoloaders 200A-C (collectively referred to as autoloaders 200), in accordance with an embodiment of the description. Autoloaders 200 represent an example hardware implementation of autoloaders 120 illustrated in FIG. 1. However, it should be appreciated that the techniques described herein are not limited to the specific autoloader apparatus illustrated, but rather are broadly applicable to any apparatus used for pickup of packages by UAVs. Autoloaders 205 are apparatuses adapted to load packages onto lines deployed from UAVs 105. Autoloaders 200 provide a low touch autoloading function by disconnecting the act of staging a package that is ready for pickup from the act of pickup itself by UAVs 105. As illustrated in FIG. 2, autoloader 200A has been loaded with a package 205 that is ready for delivery. The autoloading apparatus includes booms that guide a line 210 deployed from UAV 105 into a receiver base 215 where package 205 is staged and waiting for pickup. Line 210 may include an end attachment 220 that is guided into alignment with and attached to package 205 by receiver base 215. Once attached, UAV 105 can recoil line 210 with package 205 attached thereto before transitioning to a cruise segment of the package delivery mission.

There are at least three technical tasks that need to be accomplished in the field of machine vision perception to visually navigate UAV 105 into alignment with autoloader 200A to pickup package 205 in an automated manner without a human attendant present to facilitate transfer of package 205 onto line 210. These tasks include aerial detection of autoloaders 200, localization of autoloaders 200 relative to UAV 105, and identification of the specific autoloader 200A pre-staged with the correct package 205 (when a group of autoloaders are present as illustrated in FIG. 2). All three of these tasks may be accomplished using visual fiducial markers 225 (e.g., two-dimensional matrix barcodes), such as AprilTags. A unique visual fiducial marker 225 may be placed on the ground adjacent to a corresponding autoloader 200 with a fixed offset and orientation relative to the given autoloader 200. The machine vision system onboard UAV 105 can then detect, localize, and identify the corresponding autoloaders 200 by detecting, localizing, and identifying visual fiducial markers 225 and assuming the fixed offset and orientation of the corresponding autoloader 200.

The use of visual fiducial markers 225 for detection, localization, and identification can have a number of drawbacks. First, the visual fiducial markers become a single point of failure that is susceptible to fading, wearing out, damage, visual obstructions due to dirt and debris, shadows, etc. In order for the visual fiducial markers to be effective at useful altitudes, they are often relatively large and thus not aesthetically pleasing. Furthermore, their large size presents additional shipping logistics when deploying a new autoloader and must be correctly installed (position and orientation) relative to the associated autoloader 200. This makes the visual fiducial marker paradigm susceptible to human error during installation.

Embodiments described herein may be used as a redundant or backup technique for detection and localization of autoloaders 200 in the event of failure of visual fiducial markers 225. Alternatively, the machine vision perception techniques described herein may be deployed as the primary, or sole, technique for detection and localization of autoloaders 200 by UAVs 105. The techniques described may use the same onboard camera and machine vision systems as used to detected visual fiducial markers 225, but with functionality programmed or trained to detect the physical structures of the autoloaders 205 themselves. In particular, the techniques described use an image classifier to detect the autoloader structures, and keypoints thereof, in aerial images and then use these keypoints for detection and localization. The identification portion may be accomplished using a variety of mechanisms disposed on or near each autoloader 200 including visual codes (e.g., color patterns, bar codes, 2D visual codes, etc.), infrared beacons, near-field wireless communications (e.g., RF identifier tags, Bluetooth communications, etc.), or otherwise. Accordingly, the detection and localization techniques described herein are not reliant upon large, unsightly visual fiducial markers. The techniques use aerial images of the autoloader structures themselves for detection and localization and thus are less susceptible to human installation error or environmental factors (dirt, debris, shadows, etc.).

Figure 3:
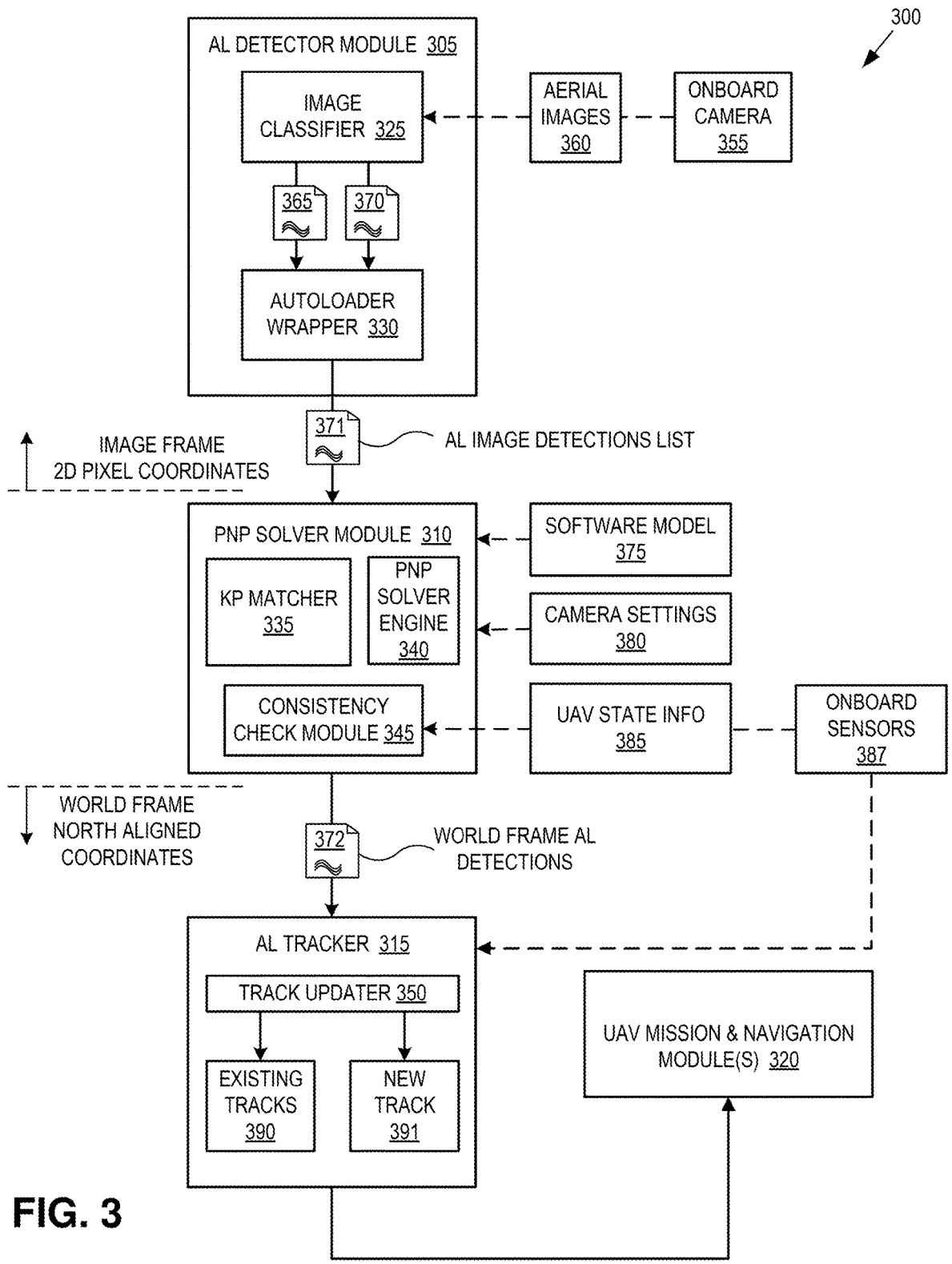
FIG. 3 is a system software architecture for implementing autoloader perception capable of automated detection and localization, in accordance with an embodiment of the disclosure.

FIG. 3 is a system software architecture 300 for implementing autoloader perception capable of automated detection and localization of autoloaders 200 by UAVs 105, in accordance with an embodiment of the disclosure. The illustrated embodiment of architecture 300 includes an autoloader (AL) detector module 305, a perspective-n-point (PNP) solver module 310, an AL tracker 315, and UAV mission and navigation modules 320. The illustrated embodiment of AL detector module 305 includes an image classifier 325 and an autoloader wrapper 330. The illustrated embodiment of PNP solver module 310 includes a keypoint (KP) matcher 335, a PNP solver engine 340, and a consistency check module 345. The illustrated embodiment of AL tracker 315 includes a track updater 350. FIG. 3 illustrates a processing pipeline for implementing a machine vision perception capable of automated detection and localization of autoloading apparatuses.

AL detector module 305 is coupled to an onboard camera 355 of UAV 105 to receive and process aerial images 360. Aerial images 360 may be images of an area (e.g., ground area) below UAV 105, which includes one or more autoloaders 200. In one embodiment, image classifier 325 is a machine learning neural network trained to identify a specific object, such as autoloaders 200, and separately identify keypoints on that object such as visually distinctive locations on the object. For example, the keypoints may correspond to left and right arm tips, left and right elbow joints, the top of the vertical support post, etc. Image classifier 325 may be trained to perform its detections using a dataset of aerial images that have been annotated with ground truth data by humans that label these visually distinctive locations in the aerial images. Furthermore, the training data may also include bounding boxes drawn around the autoloaders to train the neural network to identify the whole object. Of course, other training techniques may also be used. For example, the neural network may also be trained on simulated/synthetic data where the ground truth data for the autoloader and keypoints are known.

Figure 5A:
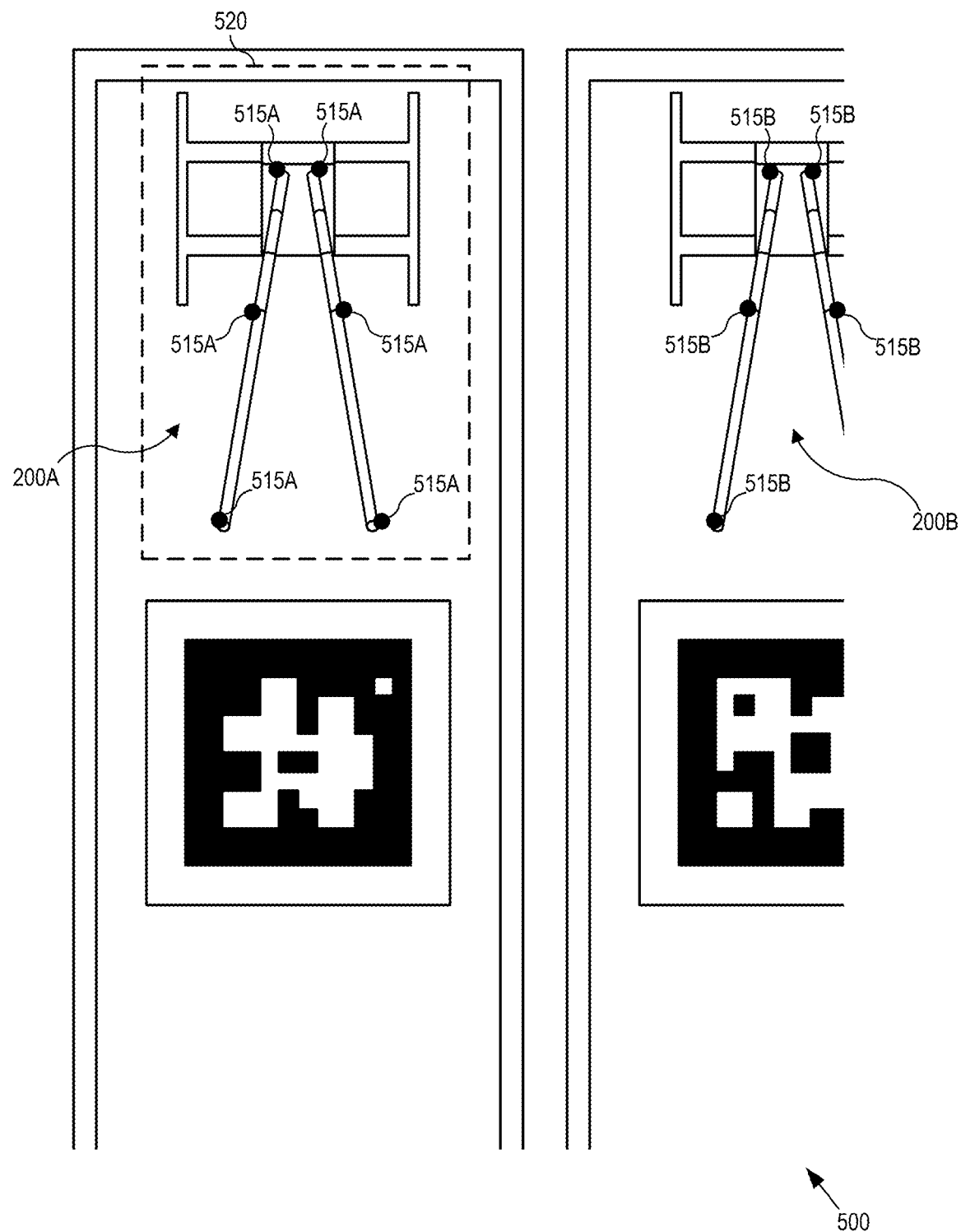
FIG. 5A illustrates an aerial image of an autoloader encircled by a bounding box with keypoint pixels annotated, in accordance with an embodiment of the disclosure.

In the illustrated embodiment, image classifier 325 takes in an aerial image 360 and outputs a list 365 of keypoint detections and a list 370 of autoloaders. For example, image classifier 325 may receive an aerial image 500, as illustrated in FIG. 5A, which includes a first autoloader 200A and a portion of an adjacent autoloader 200B. In one embodiment, image classifier 325 has been trained to visually identify keypoints (KPs) 515A and 515B on the autoloaders while also separately identifying the autoloaders as a whole by drawing a bounding box 520 around each entire autoloader. In one embodiment, image classifier 325 performs semantic segmentation on aerial images 360 to detect instances of the autoloader within a given aerial image 360. Both lists 365 and 370 may be presented in the reference frame of the image and keyed to 2D pixel coordinates. For example, list 365 may include a list of keypoint pixels in a given aerial image indicating the KP type (e.g., left arm tip, right arm tip, left elbow, etc.) along with the 2D pixel coordinate of each keypoint pixel. The keypoint pixels are image pixels that image classifier 325 has deemed to correspond to keypoints on an autoloader. In one embodiment, image classifier 325 may be a multilayer classifier that outputs a confidence value for each pixel in the image indicating the likelihood that each pixel corresponds to a particular KP type or category. Confidence level thresholds may be applied to categorize each KP pixel. Similarly, list 370 may include a list of bounding boxes that encircle an autoloader in the aerial image and provide the corresponding locations of each bounding box in pixel coordinates. In yet another embodiment, list 365 may be generated in a 2D visual format where each pixel is a multibit value corresponding to each KP type or not a keypoint. Keypoints detected by image classifier 325 may also be represented as image coordinate locations that do not directly correspond to pixel locations. For example, the image coordinate locations could split boundary pixels that fall along the boundaries of the specified locations thereby creating partial keypoint pixels that partially fall within the designated image coordinate locations. Furthermore, the classification of pixels in an aerial image as being keypoint pixels associated with keypoints on the autoloader (or other object) can be accomplished either by classifying locations within the aerial image associated with select pixels or by classifying the select pixels themselves.

Autoloader wrapper 330 receives the lists 365 and 370 from image classifier 325 and logically associates each keypoint pixel with a given autoloader. In other words, autoloader wrapper 330 groups the keypoint pixels into autoloader groups. The groupings may be accomplished using the bounding boxes from list 370 (e.g., all keypoint pixels falling within a given bounding box are associated into a single autoloader group) or a clustering algorithm may be applied to list 365 to identify autoloader groups. Autoloader wrapper 330 outputs an AL image detections list 371. FIG. 5B illustrates an example AL image detection list 371, which identifies autoloader groups (keypoint sets), the 2D pixel coordinates of each keypoint pixel, and the KP type/category associated with each keypoint pixel. It is noteworthy that while each autoloader may have a fixed number of keypoints (e.g., six or eight different keypoints), each autoloader group need not have keypoint pixels associated with all keypoints and not all autoloader groups need have the same number or combination of identified keypoints. Environmental factors (e.g., visual obstructions, shadows, image glare, etc.) along with viewing perspective may result in image classifier 325 identifying different combinations of keypoints in a given aerial image.

PNP solver module 310 takes in AL image detection list 371 specified in the image frame (2D pixel coordinates) and outputs world-frame autoloader detections 372. In other words, PNP solver module 310 generates translation vectors that convert the keypoint sets in the 2D pixel coordinates to an estimate of a relative position of each detected autoloader in the world frame of UAV 105. In one embodiment, the translation vectors convert the keypoint pixels in the 2D pixel coordinates into a fixed world frame (e.g., north align) to simplify tracking and navigation.

In addition to the vector translation between pixel coordinates and world frame (e.g., north aligned coordinates), PNP solver module 310 also vets the keypoint detections identified in AL image detection list 371. First, KP matcher 335 compares a given keypoint set within AL image detections list 371 to a software model 375 of autoloaders 200. Software model 375 may be a 3D computer aided design (CAD) model of autoloaders 200 that specifies the spatial relationship between the keypoints. If KP matcher 335 is unable to identify a match to within a threshold error, then the particular keypoint set is rejected as a false detection. If a match is identified, then the matched keypoint set is passed onto PNP solver engine 340 to estimate the 3D pose of UAV 105 relative to autoloader 200A. In one embodiment, intrinsic camera settings 380 (e.g., lens power, zoom setting, f-stop, etc.) of onboard camera 355 are provided to PNP solver engine 340, which then uses perspective-n-point algorithms to estimate a 3D pose of onboard camera 355. The 3D pose estimate may be a six degree-of-freedom (DOF) estimate including a 3D translation estimate along with roll, pitch, and yaw estimates of onboard camera 355 relative to a particular autoloader 200. Alternatively, PNP solver engine 340 may be implemented with a trained regression model that takes in keypoint locations and outputs a 3D pose.

PNP solver module 310 further incorporates a consistency check module 345 that analyzes the 3D pose estimate against UAV state information 385 acquired in real-time, or near real-time, from onboard sensors 387 (e.g., inertial measurement unit, accelerometer, gyroscope, compass, GPS data, etc.). The measured UAV state information can be compared against known assumptions about the autoloader's position (e.g., autoloaders are positioned vertically on the ground, etc.). If the PNP solver engine 340 generates position estimates that are inconsistent with positional/orientational assumptions about the autoloaders given the current position/orientation of the UAV 105 as measured by its onboard sensors 387, then the given relative position estimate may be rejected as an erroneous estimate and the positional estimate is not forwarded onto AL tracker 315.

AL tracker 315 receives world frame autoloader detections 372 and categories each detection as either associated with an existing track 390 (i.e., already detected autoloader) or a new track 391 (first detection of a new autoloader). AL tracker 315 includes a track updater 350 that maintains state information between aerial image frames so that the individual autoloaders 200 may be tracked across time. In some embodiments, aerial images 360 may enter the processing pipeline illustrated in FIG. 3 between 1 to 10 Hz, though other rates are possible. The image frame rate along with motion data from onboard sensors 387 indicative of the rotational/translational motion of onboard camera 355 between image frames can be used to apply movement/displacement thresholds between the consecutive aerial images to aid in categorizing autoloader detections into an existing track 390 or a new track 391.

The relative position estimates in the world frame that are tracked across time between aerial images are then provided to the UAV mission and navigation modules 320 to navigate UAV 105 into alignment with autoloader 200A. UAV mission and navigation modules 320 may include various avionics and mission control software.

Figure 4A:
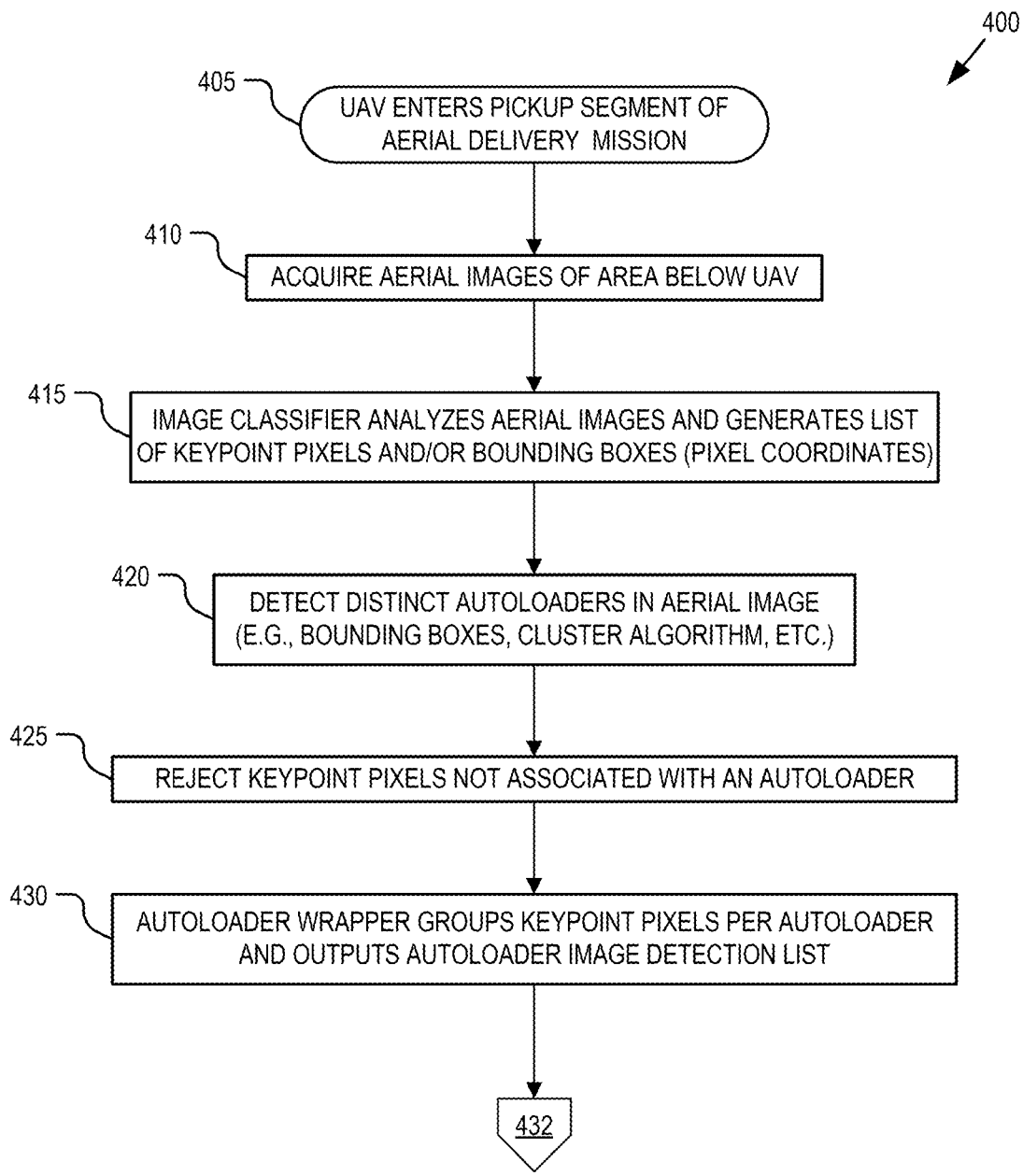
FIGS. 4A-C are a flow chart illustrating a method of operating a UAV for automated detection and localization of an autoloader, in accordance with an embodiment of the disclosure.
Figure 4B:
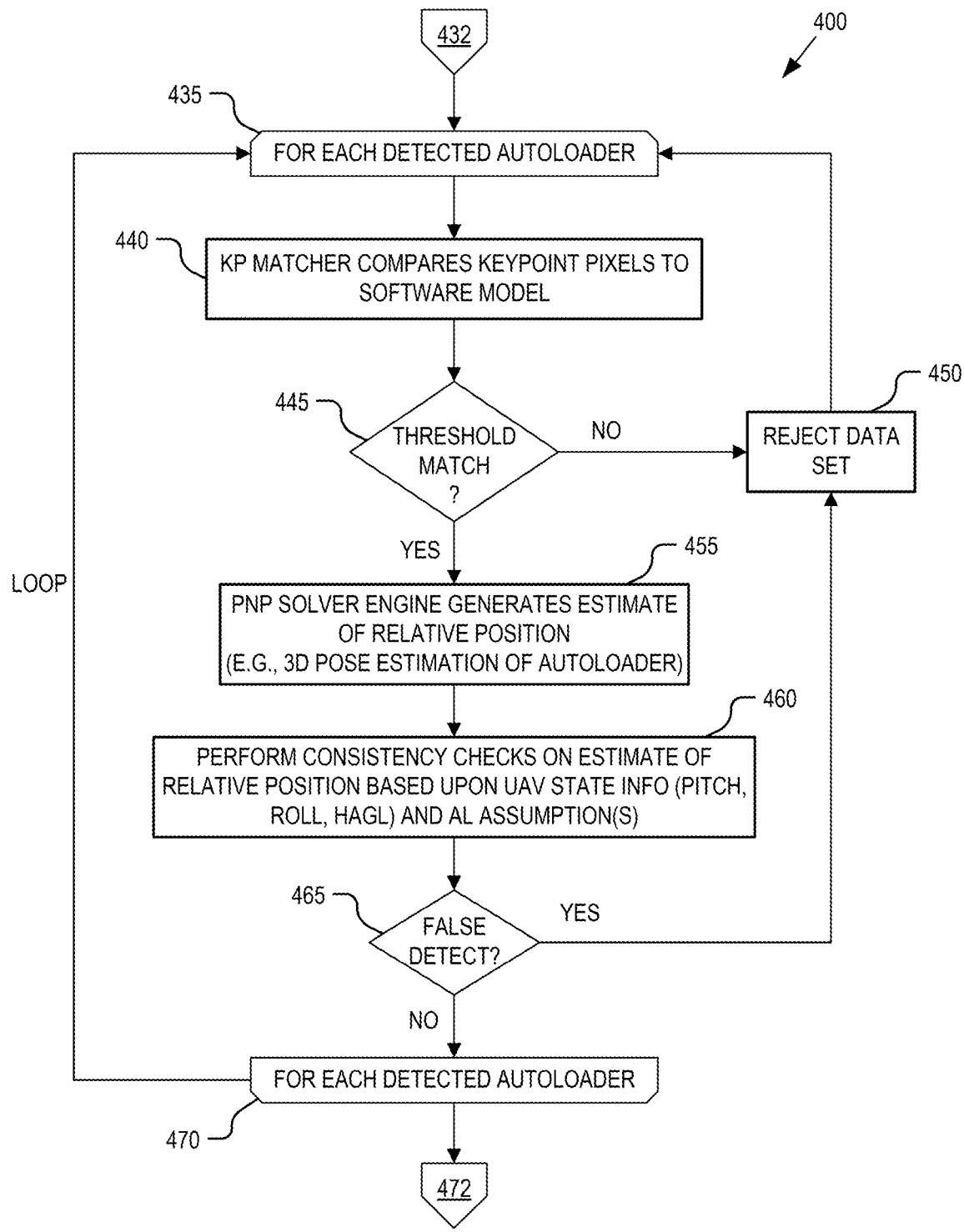
Figure 4C:
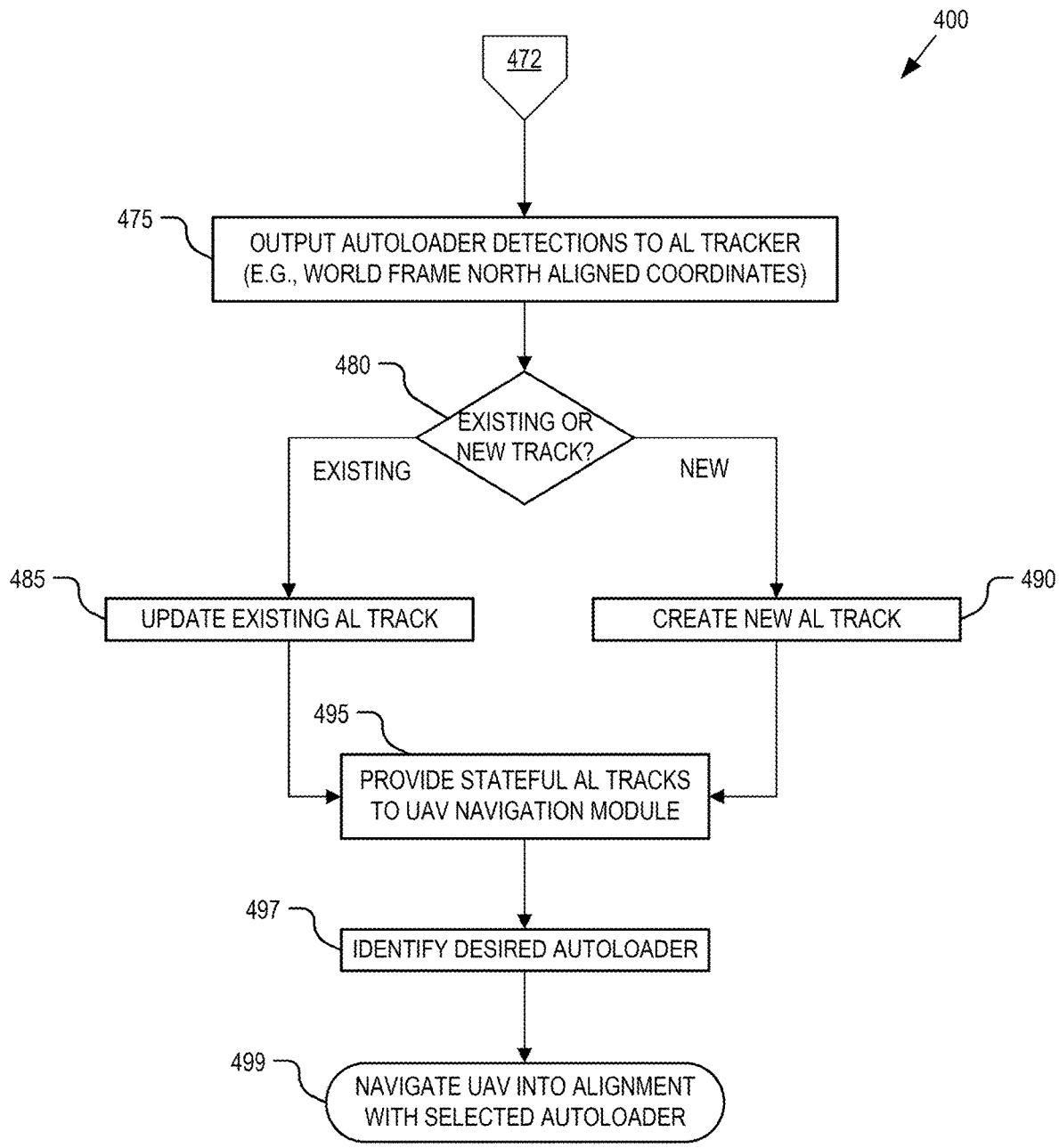

FIGS. 4A-C are a flow chart illustrating a process 400 of operating a UAV 105 for automated detection and localization of autoloader 200A, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. Although process 400 is described in connection with picking up packages from autoloaders 200, it should be appreciated that process 400 may be generally applicable for navigating UAVs 105 into alignment with a variety of ground-based objects for a variety of purposes. Similarly, autoloaders 200 may assume a variety of different form factors than illustrated in FIG. 2.

In a process block 405, UAV 105 is executing an aerial delivery mission and enters a pickup segment of the mission upon reaching the vicinity of autoloaders 200. In one embodiment, the pickup segment is entered based upon global positioning system (GPS) coordinates. Upon entering the pickup segment, UAV 105 commences a descent towards autoloaders 200 while acquiring aerial images 360 of the area below UAV 105 (process block 410). Aerial images 360 are acquired with onboard camera 355, which may be positioned on the underside of UAV 105 to capture downward facing aerial images. In one embodiment, aerial images 360 are continuously acquired at a frame rate ranging between 1 Hz to 10 Hz. Of course, other frame rates may be used and onboard camera 355 may acquire aerial images at higher frame rates (e.g., 30 to 60 Hz) though only select instances of those aerial images may be fed into the processing pipeline illustrated in FIG. 3 for detection and localization of autoloaders 200. FIG. 5A illustrates an example aerial image 500 that captures an image of autoloader 200A and a portion of autoloader 200B disposed adjacent to autoloader 200A. Accordingly, aerial image 500 represents an example of one of aerial images 360.

In a process block 415, aerial image 500 is provided to and analyzed by image classifier 325 of AL detector module 305. Image classifier 325 analyzes aerial image 500 to classify select pixels of aerial image 505 as being keypoint (KP) pixels associated with keypoints on autoloaders 200. As mentioned, keypoints may correspond to visually distinctive locations (e.g., intersections between structural members, proximal/distal endpoints on structural members, etc.) on autoloaders 200. FIG. 5A illustrates example keypoints 515. The pixels in aerial image 500 that correspond to those keypoints are referred to as KP pixels.

In one embodiment, image classifier 325 also analyzes aerial image 505 to identify autoloaders 200 as a whole and draws a bounding box 520 around any autoloader 200 that is detected. In one embodiment, the detection of bounding boxes 520 and KP pixels are separate and independent outputs from image classifier 325. In one embodiment, image classifier 325 may perform semantic segmentation on aerial image 500 to detect the various instances of autoloader 200, including autoloader 200A in FIG. 5A. In other embodiments, the bounding boxes 520 are a direct output of the machine learning neural network. Image classifier 325 outputs list 365 of keypoint detections and optionally a list 370 of autoloader detections to autoloader wrapper 330. Lists 365 and 370 are defined in the image frame of reference (e.g., 2D pixel coordinates) of aerial image 500.

The generation of bounding boxes 520 represents one possible way of detecting distinct instances of autoloaders 200 by autoloader wrapper 330 (process block 420). Each distinct bounding box 520 encircles the image of a corresponding and distinct autoloader 200 captured in aerial image 500. All KP pixels falling within a common one of the bounding boxes may be grouped together and associated with a given instance of autoloaders 200. In lieu of (or in addition to) list 370, autoloader wrapper 330 may execute a clustering algorithm on KP pixels identified in list 365 to identify clusters of keypoints that can then be grouped and associated with a given instance of an autoloader 200 (process block 420).

AL detector module 305 may also perform a false detection function by rejecting any of the KP pixels that are not associated with an instance of an autoloader (process block 425). For example, any KP pixel not residing within a bounding box 520 (or grouped with a cluster) may be deemed a spurious false keypoint detection and rejected. Once autoloader wrapper 330 either rejects or groups all KP pixels into an associated autoloader group, then AL image detection list 371 is output to PNP solver module 310. FIG. 5B illustrates an example autoloader image detection list 371 including four KP pixels grouped into autoloader group 1 and three KP pixels grouped into autoloader group 2. It should be appreciated that a keypoint set associated with a given autoloader group need not detect all available keypoints and each keypoint set may not detect the same set of keypoint types. This results from the fact that different keypoints may be obstructed at different times from the particular vantage point of onboard camera 355. However, in the illustrated embodiment, isolated or solo keypoint detections (or other minimum threshold number of clustered KP pixels) will be rejected and will not be categorized into their own autoloader group. Even if the particular isolated keypoint pixel turns out to be a valid keypoint detection based upon future aerial images, the processing of the current aerial image will reject that keypoint detection. At off-page reference 432, process 400 continues to FIG. 4B.

Continuing from off-page reference 432, process 400 enters a loop executed by PNP solver module 310 for each autoloader 200 detected in aerial image 500 and identified in AL image detections list 371. The loop extends between blocks 435 and 470 and repeats for each detected autoloader 200. In a process block 440, KP matcher 335 compares the KP pixels within a keypoint set to software model 375. The comparison includes comparing the spatial positions of the KP pixels to the spatial positions of the associated keypoints spatially defined in software model 375. If the KP pixels spatially match the associated keypoints defined in software model 375 within a threshold error (decision block 445), then process 400 continues to a process block 455. On the other hand, if the KP pixels do not spatially match the associated keypoints defined in software model 375 within the threshold error (decision block 445), then the particular keypoint set in AL image detections lists 371 is rejected as a false detection (process block 450) and the loop returns to process block 435 to analyze the next keypoint set.

A keypoint set with spatially matching KP pixels is passed onto PNP solver engine 340. PNP solver engine 340 generates an estimate of the relative position of UAV 105 to the particular instance of the autoloader 200 (process block 455). In one embodiment, the estimated relative position may be a 3D pose estimate in a world frame of reference (e.g., north aligned coordinate system). Although FIG. 3 illustrates a perspective-n-point machine vision analysis, other types of vision-based localization algorithms may alternatively be implemented.

Once the estimated relative position is generated, consistency check module 345 performs a consistency check on the estimated relative position (process block 460). The consistency check is a sort of "gut check" as to whether the estimated relative position makes sense based upon measurable variables and autoloader assumptions. For example, consistency check module 345 is privy to the position and orientation of UAV 105 (and by extension onboard camera 355) when aerial image 500 was acquired. This UAV state information 385 is measured from onboard sensors 387. Camera settings 380 in effect when capturing aerial image 500 may also be considered. Furthermore, consistency check module 345 is programmed with positional and/or orientational assumptions of autoloaders 200 themselves. For example, autoloaders 200 are assumed to be positioned upright or may face a specified direction. If the PNP solver engine 340 generates an estimated relative position for autoloader 200A that is nonsensical, violates these assumptions, or is otherwise inconsistent with the measured orientation of UAV 105 and the positional/orientational assumptions established for autoloaders 200, then the estimated relative position is deemed an erroneous estimate (decision block 465) and the estimate is rejected as failing the consistency check (process block 450). If the estimated relative position passes the consistency check (decision block 465), then process 400 continues to FIG. 4C via off-page reference 472.

In a process block 475, the estimated relative positions of each autoloader 200 that passes the consistency check are passed to AL tracker 315 as world frame autoloader detections 372. These detections are described in the world reference frame and may further be described in fixed world reference frame such as north aligned coordinates. AL tracker 315 uses the estimated relative positions of the autoloaders 200 to track their positions over time across sequential captures of aerial images 360. AL tracker 315 maintains this stateful information by categorizing each world frame autoload detection 372 as new positional data regarding an existing track associated with an autoloader 200 already being tracked, or new positional data regarding a new autoloader 200 just detected for the first time (decision block 480). Motion data from onboard sensors 387 along with movement thresholds may be used to categorize each world frame autoloader detection 372 in a new or existing autoloader track.

A world frame autoloader detection 372 deemed to be part of an existing autoloader track is used to update the existing autoloader track (process block 485) while a world frame autoloader detection 372 deemed to be part of a new autoloader track is used to create/instantiate a new autoloader track (process block 490). The new and existing autoloader tracks provide stateful positional information to UAV mission and navigation modules 320 for navigation (process block 495).

If UAV 105 is seeking to identify a specific one of autoloaders 200 (e.g., autoloader 200A) for a package pickup, then various techniques may be applied to identify the specific autoloader 200 (process block 497). For example, if visual fiducial markers 225 are present, they may be referenced for the sake of identification. Otherwise, autoloaders 200 may include other unique identifying information mounted to or otherwise displayed on the frames of autoloaders 200 themselves. Such unique identifying information may include infrared beacons, placards, barcodes, QR codes, distinct paint schemes, etc. With the stateful tracking information of each autoloader 200 and the correct autoloader 200A identified, the UAV mission and navigation modules 320 may navigate UAV 105 into alignment with autoloader 200A, deploy line 210 and retrieve package 205.

Figure 6A:
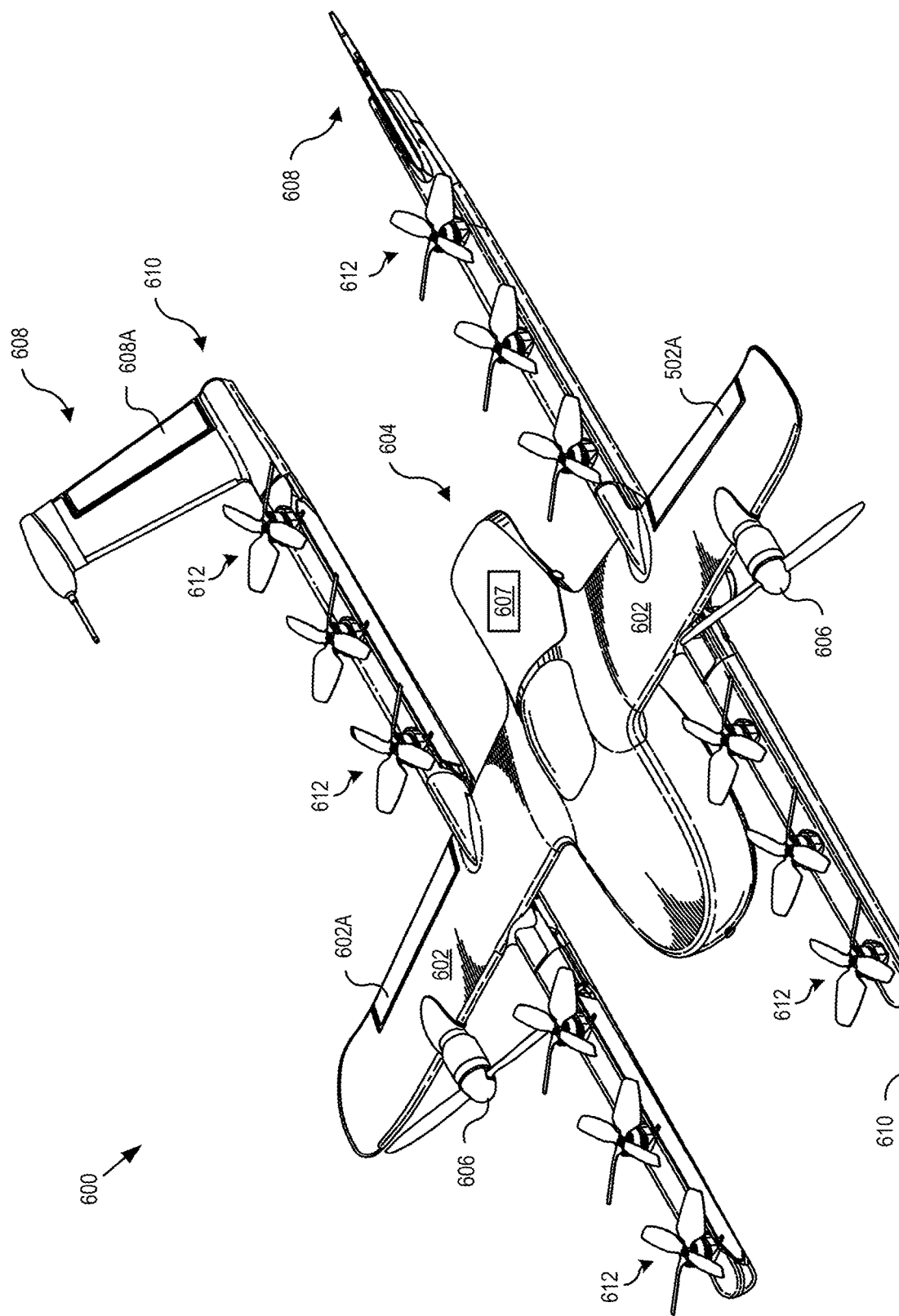
FIG. 6A is a perspective view illustration of a UAV configured for automated retrieval of packages from an autoloader, in accordance with an embodiment of the disclosure.
Figure 6B:
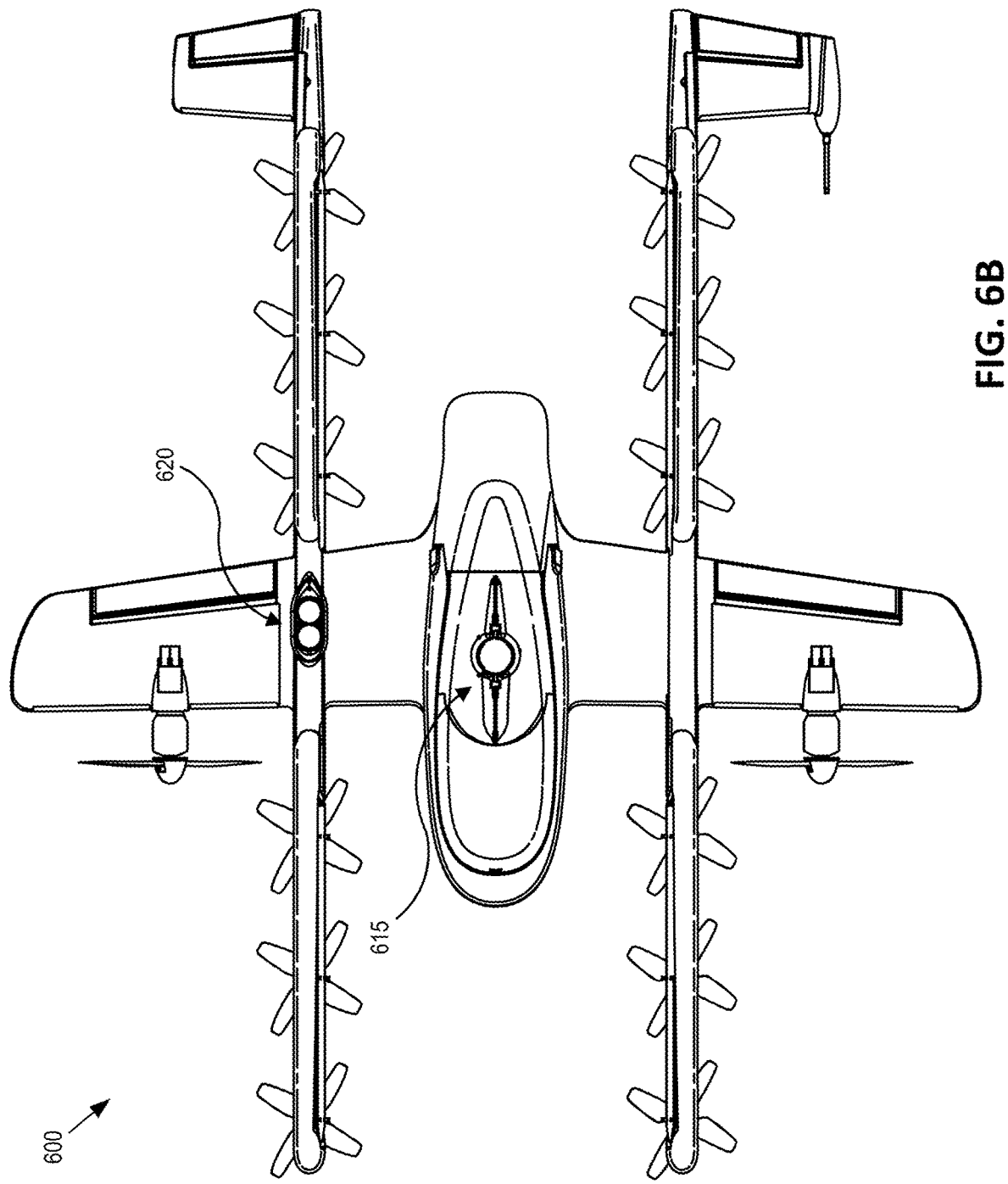
FIG. 6B is an underside plan view illustration of the UAV configured for automated retrieval of packages from an autoloader, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIGS. 1 and 2, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for dispensing and recoiling line 210 when picking up package 205 during a package delivery mission. In some embodiments, the mission payload module may include camera/sensor equipment (e.g., camera, lenses, radar, lidar, pollution monitoring sensors, weather monitoring sensors, scanners, etc.). In FIG. 6B, an onboard camera system 620 is mounted to the underside of UAV 600 to support a machine vision system (e.g., monovision frame camera, stereoscopic machine vision, event camera, lidar depth camera, etc.) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Onboard camera 620 represents one possible implementation of onboard camera 355.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608A for controlling the aerial vehicle's yaw, and wing assembly 602 may include elevators for controlling the aerial vehicle's pitch and/or ailerons 602A for controlling the aerial vehicle's roll. While the techniques described herein are particularly well-suited for VTOLs providing an aerial delivery service, it should be appreciated that embodiments are not thus limited.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of operation of an unmanned aerial vehicle (UAV), the method comprising:
acquiring an aerial image with an onboard camera of the UAV, wherein the aerial image includes one or more instances of an object;
analyzing the aerial image with an image classifier to classify select pixels of the aerial image as being keypoint pixels associated with keypoints of the object;
grouping the keypoint pixels into one or more groups including a first group of the keypoint pixels, wherein each of the one or more groups of the keypoint pixels is associated with a corresponding one of the one or more instances of the object, and wherein the first group of the keypoint pixels is associated with a first instance of the one or more instances of the object;
generating an estimate of a relative position of the UAV to the first instance of the object based at least partially upon a machine vision analysis of the first group of the keypoint pixels;
acquiring state information of the UAV from one or more onboard sensors of the UAV;
performing a consistency check on the estimate of the relative position by referencing the state information and at least one assumption of an orientation of the first instance of the object;
rejecting the estimate of the relative position as an erroneous estimate if the consistency check fails; and
navigating the UAV relative to the first instance of the object based upon the estimate of the relative position if the consistency check passes,
wherein the object comprises an apparatus adapted to transfer a package to the UAV.

2. The method of claim 1, wherein the object comprises an autoloading apparatus that is adapted to load the package onto a line deployed from the UAV and the keypoints comprise visually distinctive locations on the autoloading apparatus.

3. The method of claim 2, further comprising:
comparing the first group of the keypoint pixels to a software model of the autoloading apparatus that specifies a spatial relationship of the keypoints on the autoloading apparatus; and
rejecting the first group of the keypoint pixels as a false detection of the autoloading apparatus when the spatial relationship of the first group of the keypoint pixels fails to match the spatial relationship of the keypoints defined in the software model within a threshold error.

4. The method of claim 1, wherein the machine vision analysis includes a perspective-n-point analysis of the first group of the keypoint pixels.

5. The method of claim 1, wherein grouping the keypoint pixels comprises:
analyzing the aerial image to detect the one or more instances of the object in the aerial image;
generating one or more bounding boxes that each encircles an associated one of the one or more instances of the object detected; and
grouping the keypoint pixels that fall within a common one of the bounding boxes.

6. The method of claim 5, further comprising:
rejecting any one of the keypoint pixels that does not fall within one of the bounding boxes as a false keypoint detection.

7. The method of claim 6, wherein the one or more bounding boxes and the keypoint pixels are independent outputs of the image classifier, and wherein the image classifier comprises a neural network trained to separately identify both the keypoints and the object.

8. The method of claim 1, wherein generating the estimate of the relative position of the UAV to the first instance of the object comprises:
generating the estimate of the relative position in a world frame coordinate system aligned to a fixed direction.

9. The method of claim 1, further comprising:
tracking each of the one or more instances of the object in the aerial image between acquisitions of sequential aerial images including the aerial image by categorizing each detected instance as belonging to an existing object track or a new object track, wherein the categorizing is determined based on a displacement threshold determined from sensor readings output from one or more onboard motion sensors of the UAV, wherein the sensor readings are acquired between the acquisitions of the sequential aerial images.

10. The method of claim 1, wherein analyzing the aerial image with the image classifier to classify the select pixels of the aerial image as being keypoint pixels comprises classifying the select pixels themselves or classifying locations within the aerial image associated with the select pixels.

11. At least one non-transitory computer-readable medium storing instructions that, when executed by a control system of an unmanned aerial vehicle (UAV), will cause the UAV to perform operations comprising:
acquiring an aerial image with an onboard camera of the UAV of an area below the UAV that includes one or more instances of an autoloader that is adapted to load a package onto a line deployed from the UAV;
analyzing the aerial image with an image classifier to classify select pixels of the aerial image as being keypoint pixels associated with keypoints of the autoloader;
grouping the keypoint pixels into one or more groups including a first group of the keypoint pixels, wherein each of the one or more groups of the keypoint pixels is associated with a corresponding one of the one or more instances of the autoloader, and wherein the first group of the keypoint pixels is associated with a first instance of the one or more instances of the autoloader;
generating an estimate of a relative position of the UAV to the first instance of the object based at least partially upon a machine vision analysis of the first group of the keypoint pixels;
comparing the first group of the keypoint pixels to a software model of the autoloader that specifies a spatial relationship of the keypoints on the autoloader;
rejecting the first group of the keypoint pixels as a false detection of the autoloader if the spatial relationship of the first group of the keypoint pixels fails to match the spatial relationship of the keypoints defined in the software model within a threshold error; and
navigating the UAV relative to the first instance of the autoloader based upon the estimate of the relative position if the first group of the keypoint pixels are not rejected as the false detection.

12. The at least one non-transitory computer-readable medium of claim 11, wherein the keypoints comprise visually distinctive locations on the autoloader.

13. The at least one non-transitory computer-readable medium of claim 11, wherein the machine vision analysis includes a perspective-n-point analysis of the first group of the keypoint pixels.

14. The at least one non-transitory computer-readable medium of claim 11, wherein grouping the keypoint pixels comprises:
analyzing the aerial image to detect the one or more instances of the autoloader in the aerial image;
generating one or more bounding boxes that each encircles an associated one of the one or more instances of the autoloader detected; and
grouping the keypoint pixels that fall within a common one of the bounding boxes.

15. The at least one non-transitory computer-readable medium of claim 14, further storing instructions that, when executed by the control system, will cause the UAV to perform further operations, comprising:
rejecting any one of the keypoint pixels that does not fall within one of the bounding boxes as being a false keypoint detection.

16. The at least one non-transitory computer-readable medium of claim 15, wherein the one or more bounding boxes and the keypoint pixels are independent outputs of the image classifier, and wherein the image classifier comprises a neural network trained to separately identify both the keypoints and the autoloader.

17. The at least one non-transitory computer-readable medium of claim 11, further storing instructions that, when executed by the control system, will cause the UAV to perform further operations, comprising:
acquire state information of the UAV from one or more onboard sensors of the UAV;
performing a consistency check on the estimate of the relative position by referencing the state information and at least one assumption of a position or an orientation of the first instance of the autoloader; and
rejecting the estimate of the relative position as an erroneous estimate when the consistency check fails.

18. The at least one non-transitory computer-readable medium of claim 11, wherein generating the estimate of the relative position of the UAV to the first instance of the autoloader comprises:
generating the estimate of the relative position in a world frame coordinate system aligned to a fixed direction.

19. The at least one non-transitory computer-readable medium of claim 11, further storing instructions that, when executed by the control system, will cause the UAV to perform further operations, comprising:
tracking each of the one or more instances of the autoloader in the aerial image between acquisitions of sequential aerial images including the aerial image by categorizing each detected instance as belonging to an existing autoloader track or a new autoloader track, wherein the categorizing is determined based on a displacement threshold determined from sensor readings output from one or more onboard motion sensors of the UAV, wherein the sensor readings are acquired between the acquisitions of the sequential images.

20. The at least one non-transitory computer-readable medium of claim 11 wherein analyzing the aerial image with the image classifier to classify the select pixels of the aerial image as being keypoint pixels comprises classifying the select pixels themselves or classifying locations within the aerial image associated with the select pixels.

21. A method of operation of an unmanned aerial vehicle (UAV), the method comprising:

acquiring an aerial image with an onboard camera of the UAV of an area below the UAV that includes one or more instances of an apparatus adapted to transfer a package to the UAV;

analyzing the aerial image with an image classifier to classify select pixels of the aerial image as being keypoint pixels associated with keypoints of the apparatus;

grouping the keypoint pixels into one or more groups including a first group of the keypoint pixels, wherein each of the one or more groups of the keypoint pixels is associated with a corresponding one of the one or more instances of the apparatus, and wherein the first group of the keypoint pixels is associated with a first instance of the one or more instances of the apparatus;

generating an estimate of a relative position of the UAV to the first instance of the object based at least partially upon a machine vision analysis of the first group of the keypoint pixels;

comparing the first group of the keypoint pixels to a software model of the apparatus that specifies a spatial relationship of the keypoints on the apparatus;

rejecting the first group of the keypoint pixels as a false detection of the apparatus if the spatial relationship of the first group of the keypoint pixels fails to match the spatial relationship of the keypoints defined in the software model within a threshold error; and navigating the UAV relative to the first instance of the apparatus based upon the estimate of the relative position if the first group of the keypoint pixels are not rejected as the false detection.

\* \* \* \* \*